United States Patent [19]
Kazi et al.

[11] Patent Number: 5,578,280
[45] Date of Patent: Nov. 26, 1996

[54] OZONE GENERATOR WITH A GENERALLY SPHERICAL CORONA CHAMBER

[75] Inventors: Abdullah Kazi; Roy Hays; James Buckley, all of San Jose, Calif.

[73] Assignee: Americal Environmental Technologies, Inc., Santa Clara, Calif.

[21] Appl. No.: 431,153

[22] Filed: Apr. 28, 1995

[51] Int. Cl.⁶ .................................................. B01J 19/12
[52] U.S. Cl. .......................... 422/186.07; 422/186.08; 422/186.09; 422/186.1; 422/186.11; 422/186.12; 422/186.13; 422/186.14; 422/907
[58] Field of Search .................... 422/186.07, 186.08, 422/186.09, 186.1, 186.11, 186.12, 186.13, 186.14, 907

[56] References Cited

U.S. PATENT DOCUMENTS

| | | | |
|---|---|---|---|
| 743,433 | 11/1903 | Blackmarr et al. | 422/186.07 |
| 829,872 | 8/1906 | Lovejoy | 422/186.07 |
| 829,875 | 8/1906 | Lovejoy | 422/186.07 |
| 1,010,777 | 12/1911 | Leggett | 422/186.07 |
| 1,588,976 | 6/1926 | McBlain | 422/186.07 |
| 2,155,675 | 4/1939 | Napier | 422/186.07 |
| 2,837,654 | 6/1958 | Berghaus et al. | 250/49.5 |
| 3,005,762 | 10/1961 | Fenn | 204/164 |
| 3,024,185 | 3/1962 | Fleck | 422/186.07 |
| 3,444,061 | 5/1969 | Hellund | 204/164 |
| 3,967,131 | 6/1976 | Slipiec et al. | 250/539 |
| 4,007,118 | 2/1977 | Ciambrone | 210/632 |
| 4,062,748 | 12/1977 | Imris | 204/176 |
| 4,351,734 | 9/1982 | Kauffman | 210/748 |
| 4,507,266 | 3/1985 | Satoh et al. | 422/186.15 |
| 4,545,960 | 10/1985 | Erz et al. | 422/186.12 |
| 4,798,669 | 1/1989 | Bachhofer | 210/109 |
| 4,910,637 | 3/1990 | Hanna | 361/229 |
| 5,124,132 | 6/1992 | Francis, Jr. et al. | 422/186.07 |
| 5,190,669 | 3/1993 | Weibel | 210/759 |
| 5,211,919 | 5/1993 | Conrad | 422/186.07 |
| 5,266,216 | 11/1993 | Agueda et al. | 210/760 |
| 5,445,800 | 8/1995 | Isoda et al. | 422/186.3 |

FOREIGN PATENT DOCUMENTS

| | | |
|---|---|---|
| 920088 | 1/1973 | Canada. |
| 920979 | 2/1973 | Canada. |
| 935784 | 10/1973 | Canada. |
| 1090293 | 11/1980 | Canada ................ 204/176 |

OTHER PUBLICATIONS

L. B. Loeb, Basic Processes of Gaseous Electronics, University of California Press, Berkeley and Los Angeles, 1955 (Second Edition 1961), and Electrical Coronas–Their Basic Physical Mechanisms, University of California Press, Berkeley and Los Angeles, 1965.
Goldman M., Lecuiller M. and Palierne M., Gaseous Discharges III, Pergamon Press, 1982, p. 329.
Peyrous R. and Lacase C., Ozone Science and Engineering 8, pp. 107–128, 1986).

Primary Examiner—Charles T. Jordan
Assistant Examiner—Daniel Jenkins
Attorney, Agent, or Firm—Oblon Spivak, McClelland, Maier & Neustadt P.C.

[57] ABSTRACT

This invention relates to a novel ozone generator device for the production of high concentrations of ozone by way of a design that permits a process environment that is consonant with the optimum values of hardware and operating variables that thermodynamically favor the production of ozone. The device is characterized by a small corona chamber resulting in a low oxygen retention time, a thermally conductive ducted core permitting circulation of a coolant for cooling the feed oxygen and produced ozone, a spherical corona chamber and electrode geometry promoting a homogeneous high electric field density, operating pressures as high as 2000 psi, free expansion cooling of the oxygen at both the inlet and outlet ports of the device, and the selection of an electrode that ensures the production and maintenance of a homogeneous corona. Also disclosed is a closed-loop ozone generator system wherein unused feed oxygen is recovered and recycled for further processing by the system. Uses of the ozone generator device of this invention is more diverse than uses described in the background by virtue of the increased ozone production of the device over the background art, and includes remediation of biofoulants, biocontaminants, chlorine, chloramines and organic contaminants from drinking and process water, and the removal of sulfur dioxide and nitrogen dioxide from flue gases.

12 Claims, 4 Drawing Sheets

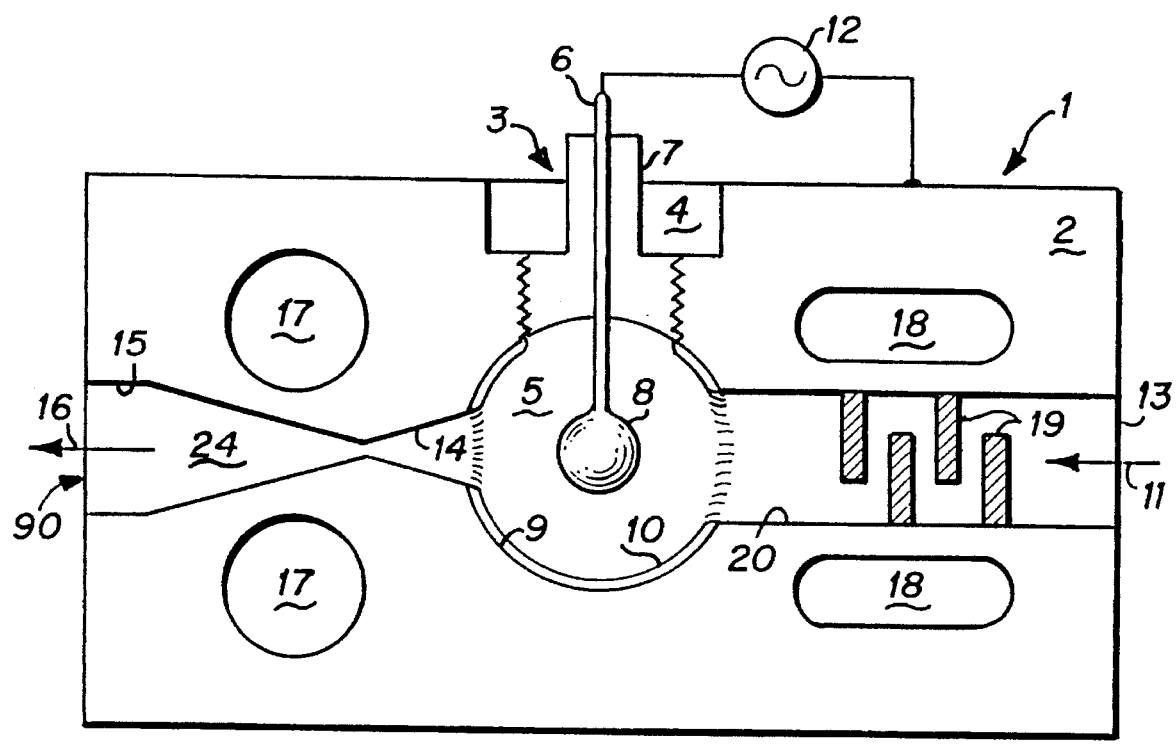
Fig_1
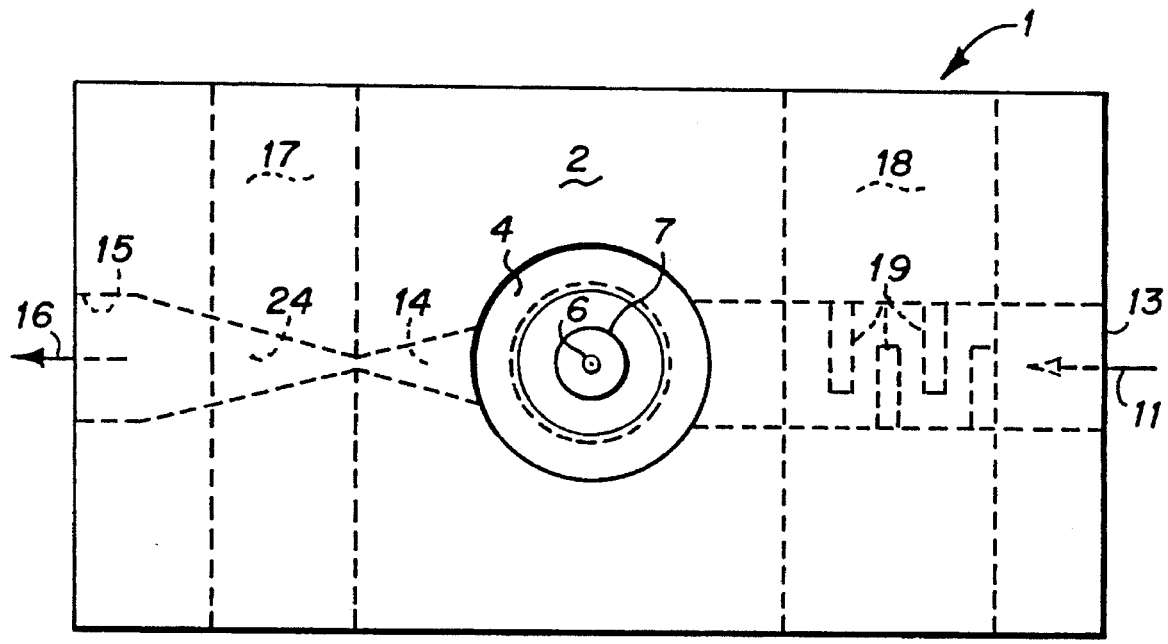
Fig_2

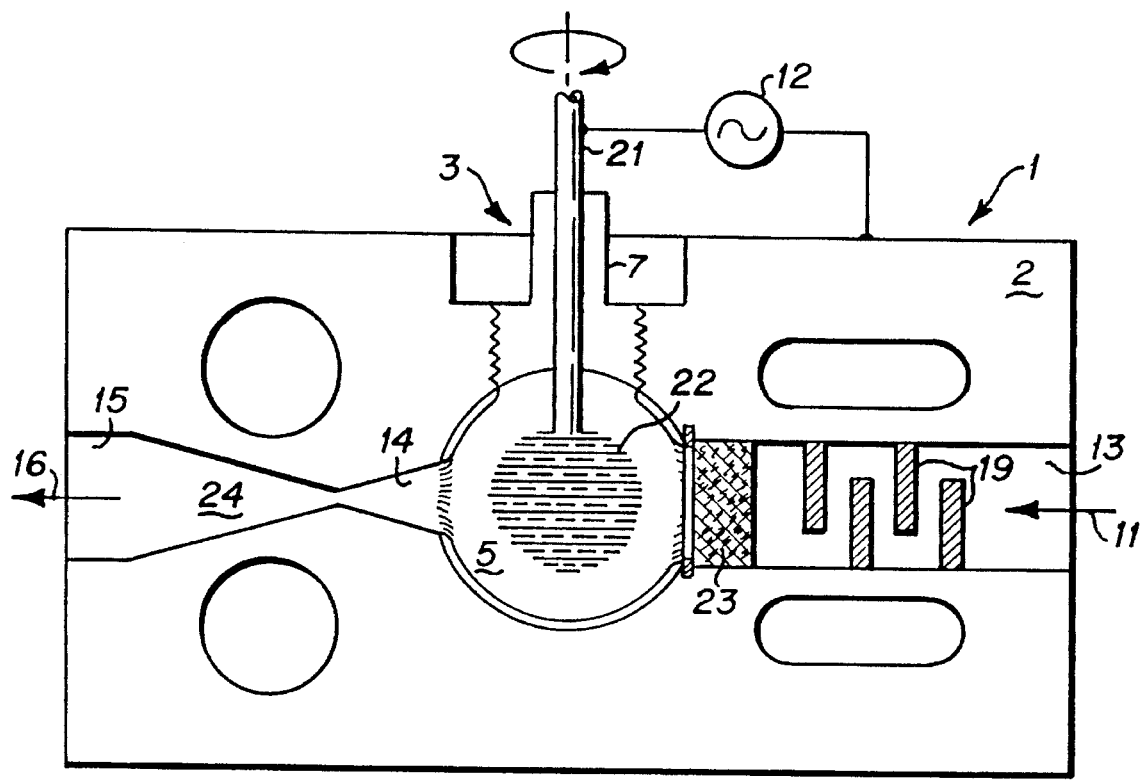
Fig_3A
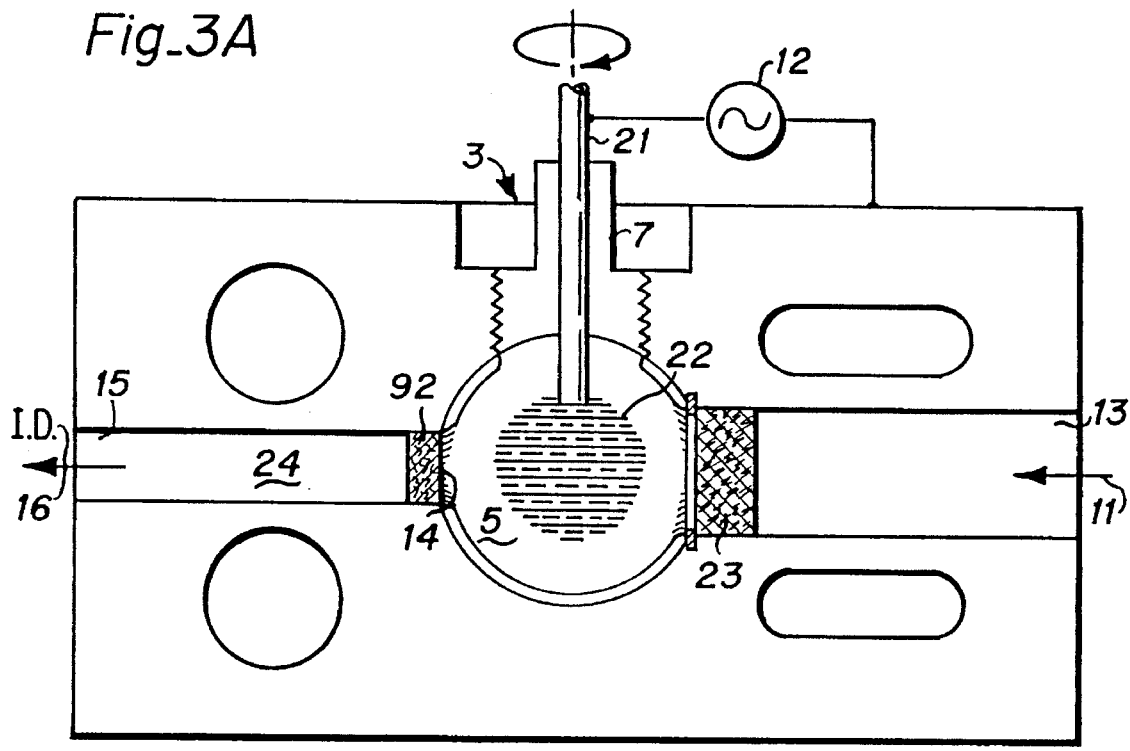
Fig_3B

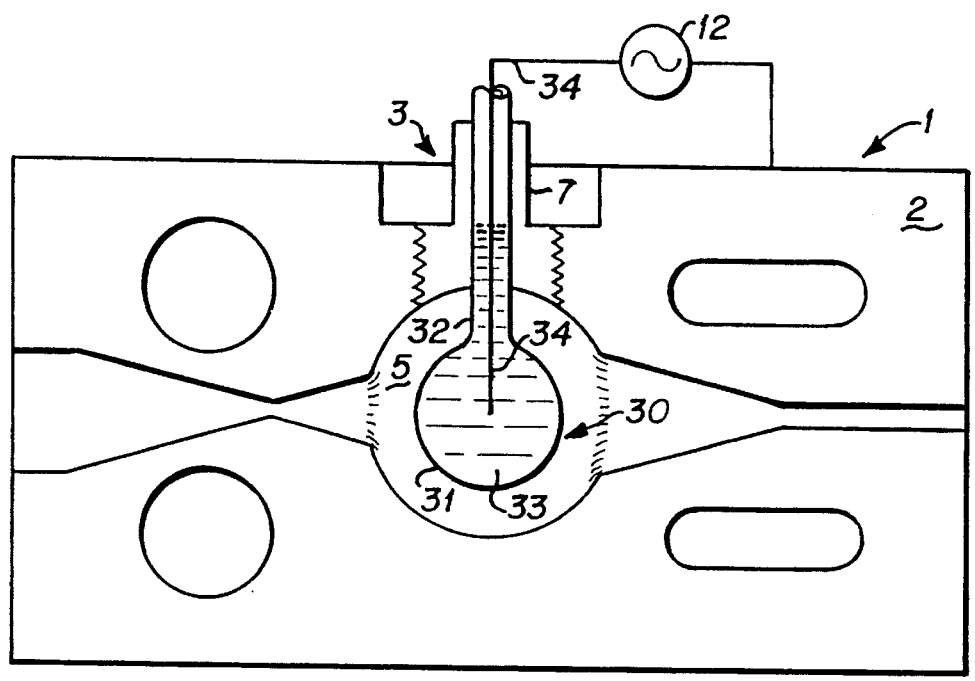
Fig_4
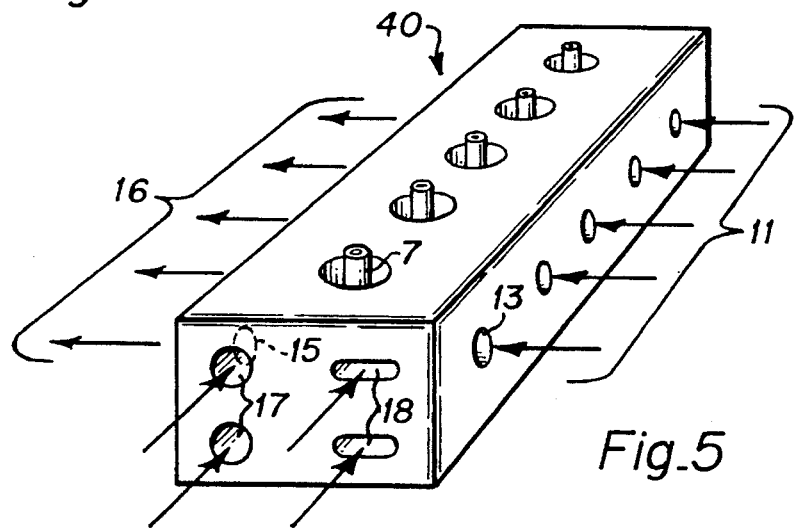
Fig_5
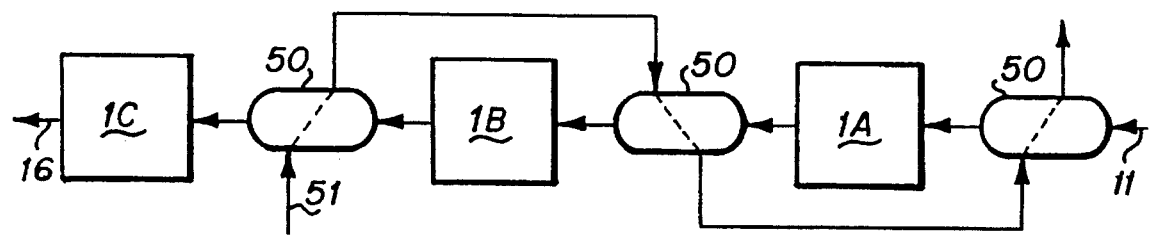
Fig_6

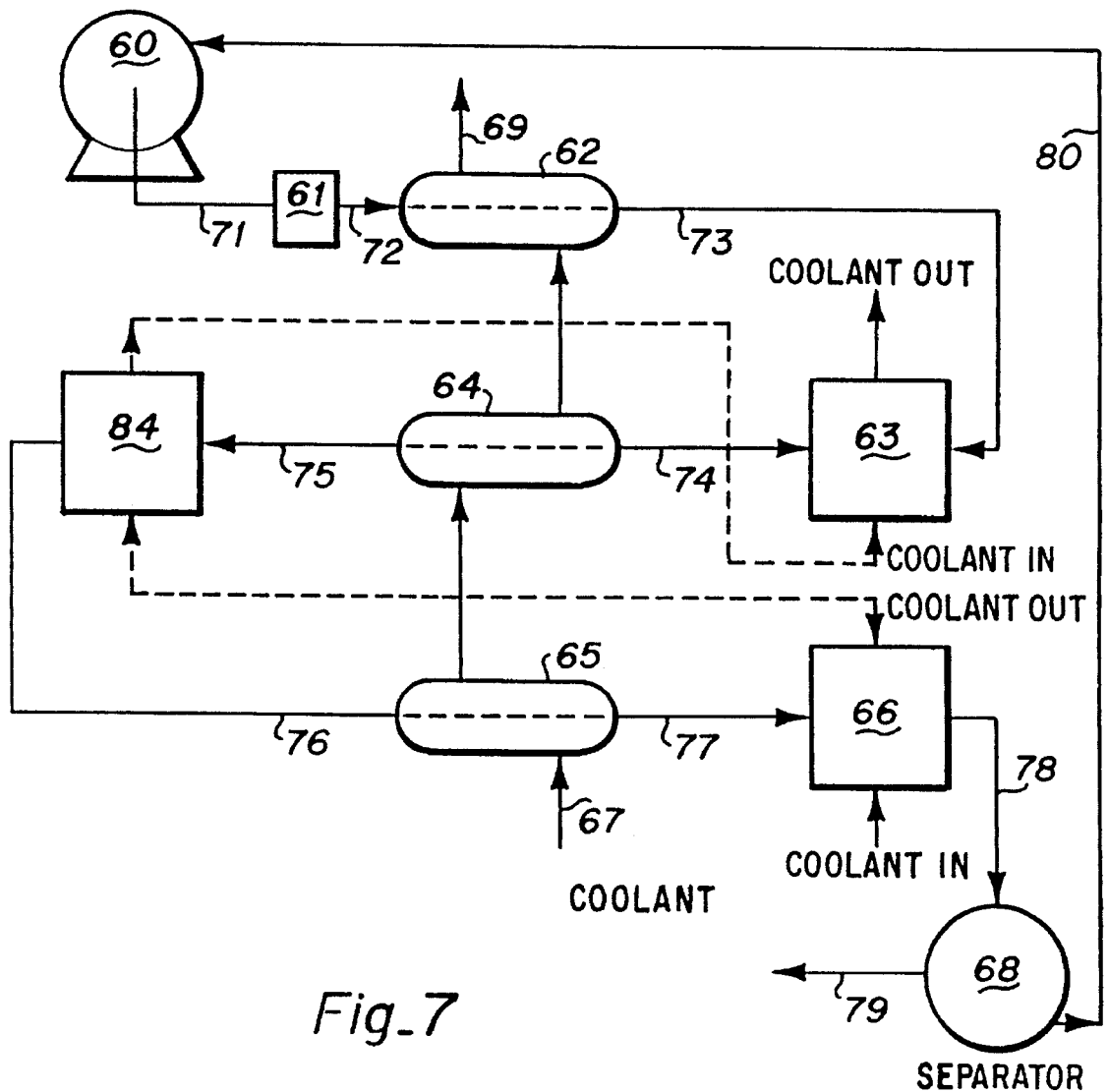
Fig_7

OZONE GENERATOR WITH A GENERALLY SPHERICAL CORONA CHAMBER

FIELD

This invention relates to an ozone generator, ozone generator systems and methods of use, and more particularly to a novel ozone generator having a small corona discharge space for reduced retention time, high oxygen feed pressure, an internal structure that cools the oxygen/ozone product and a thermally conductive core to further cool the oxygen/ozone product to provide high conversion of oxygen to ozone while using up to 50% less energy than conventional ozone generators, and a method of using the ozone generator device in a closed loop system to provide ozone for use in eliminating hydrocarbon and inorganic contamination in drinking water, process water and waste water and for the eradication of biocontaminants in drinking water, process water and waste water.

BACKGROUND

Van Marum in 1785 observed that there is a particular smell associated with electrical discharges in air. In 1801 Cruickshank noticed and confirmed the same unusual smell in an electrolytic cell for oxygen. Finally, in 1840 Schonbein a Greek scientist reproduced and identified a new gas he smelled, and in Greek "I smell" means Ozo, thus he named it as Ozone.

Ozone is a high energy state of oxygen occurring naturally in traces in the rural atmosphere and the sea-side air from the action of ultraviolet light on oxygen. It is a powerful oxidizing agent and is used in many domestic and industrial applications for wet oxidation of organics. The use of ozone is increasing throughout the world and specially ozone use has increased in the US by 400% in last five years. At this rate of growth (i.e. 30%/year) the use of ozone will increase to 2,1000% by the end of the century. Ozone's use in water treatment is extremely beneficial for the environment and provides an excellent water quality. There are no other hazardous chemicals involved and it itself reverses back to oxygen.

While oxygen may be converted into ozone by chemical, electrical and optical means, typically ozonized oxygen is produced in a special type of apparatus called an ozonizer or ozone generator. Nearly all ozone generators in use today, produce ozone by passing air or oxygen through a corona field. These ozone generators utilize the dielectric constant of various materials along with the principles of electrical capacitors at high voltages to produce a corona (or high intensity electric field) in the air space between the two electrodes of a capacitor. When oxygen passes through this highly charged corona, ozone is formed.

Ozone is an allotrope of oxygen, i.e oxygen atoms are the building blocks. The oxygen molecule has two atoms of oxygen while the ozone molecule has three atoms of oxygen. In the forward reaction, oxygen molecules convert to ozone. In the reverse reaction the ozone molecules convert back to oxygen. This conversion of oxygen into ozone is represented in the following equilibrium:

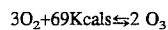

$$3O_2 + 69 Kcals \rightleftharpoons 2 O_3$$

According to the above equation the ozone production reaction is endothermic in nature. Hence the proportion of ozone in equilibrium with oxygen is small at low temperatures. The proportion of ozone increases with an increase in temperature. But at very high temperatures, the reverse reaction also increases and there is a greater decomposition of ozone back to oxygen. Both the forward and reverse reactions compete with each other and as a final result the forward reaction is faster than the reverse reaction by only 4% at room temperature (i.e. the corona helps convert 100% into ozone while the same corona converts back 96% to oxygen). Typically, ozone generators, when using dry air produce about 2% ozone with the balance being oxygen and nitrogen (i.e., the constituents of air). However, when 100% dry oxygen is used, ozone generators may produce ozone in concentrations of up to 4%. Consequently, the ozone generators currently in use today can produce only limited concentrations of ozone, typically on the order of 4%.

The Corona

The conversion of oxygen into ozone is an endothermic reaction, thus requiting energy for the conversion of oxygen to ozone. However, it is well known that this energy must be of a form other than heat energy since raising the temperature of the reactant, oxygen, will result in an increase in the decomposition rate of the desired ozone; i.e., the reverse reaction rate increases with increasing temperature. Most ozone generators in use today use a "corona discharge", i.e., a high intensity electric field with no glow discharge (visible ionization of the gas), as the most convenient source of energy for this purpose.

A corona discharge is produced between two conductors charged to a high electric potential (typically from 7,000 to 12,000 volts) and separated by an air gap and dielectric. The voltage needed to establish the high electric potential may be generated by any suitable source such as a transformer, induction coil, or a voltage multiplier circuit. A corona discharge imparts minimum heat and therefor does not raise the temperature of the oxygen, thus reducing the decomposition rate of the ozone. However, it is also known that an electric spark or arc is undesirable as this would heat the ozone and cause its decomposition almost as fast as it is formed. Moreover, arcing would lead to formation of nitrogen oxides when air is used as a feed gas, thus chemically consuming the ozone as soon as it is formed.

Spacing of the two conductors becomes critical as the breakdown potential of the air gap and dielectric is approached. Arcing will occur at the breakdown potential resulting in local heating of the ozone and it consequent decomposition. Further, as arcing is essentially a short circuit of the high voltage source, it will destroy the homogeneity of the electric field thus significantly impacting the efficiency of the ozone generator.

Electrodes

At present, nearly all ozone generating technologies utilize electrodes to produce a corona. These electrodes are usually coaxial robes and the gap between the electrodes is shielded by a dielectric substrate. Upon connecting electrodes to a high potential difference, a corona is produced which excites the oxygen to convert to ozone.

The production of ozone in a direct current corona has been investigated by numerous researchers. The basic mechanisms of the direct current corona have been documented by L. B. Loeb in two texts: Basic Processes of Gaseous Electronics, University of California Press, Berkeley and Los Angeles, 1955 (Second Edition 1961), and Electrical Coronas-Their Basic Physical Mechanisms, University of California Press, Berkeley and Los Angeles, 1965. However, the quantitative evaluation of ozone production in coronas is not discussed in either of these references.

Ozone production from pointed electrodes and wire electrodes have been reported in the literature (Goldman M., Lecuiller M. and Palierne M., Gaseous Discharges III, Pergamon Press, 1982 p 329; Peyrous R. and Lacase C., Ozone Science and Engineering 8, pp 107–128, 1986). In much of this work there is general disagreement about the efficiency of ozone production in positive or negative coronas, and the role of electrode materials in improving ozone production by catalytic processes.

The production of ozone in large quantities by corona discharges using a primary and secondary corona process in confined tabulation with forced air flow, has been described by Imris in U.S. Pat. No. 4,062,748. The apparatus shown required the forced circulation of air or oxygen through tubular arrays, to produce ozone outputs at the level of grams per hour. Corbeil, Canadian Patent No. 935,784, issued Oct. 23, 1973, describes a gas treatment apparatus in which ozone is produced by a direct current corona between a sharp point and a section of spherical gauze as the counter electrode. The device is enclosed in a robe of insulating material and disperses ozone with the aid of the associated ion wind. No measurements or estimates of the amount of ozone produced are included in the patent.

From the work of Loeb, it is clear that in the silent DC corona there can be marked differences in the effective temperature of the corona, depending on the local current density in the discharge. As the corona degenerates to a glow discharge, and finally to an arc, this temperature continually increases, thus further increasing the reverse reaction rate (i.e., decomposition of ozone into oxygen). It is known that in this are mode, the production of ozone is small, as ozone produced by dissociation of oxygen by ion impact, is quickly reverted to oxygen at the elevated temperature of the arc. Even in silent corona discharges it is important to control the local temperature in the discharge, so that ozone is not rapidly converted to oxygen after initial formation. Consequently, Loeb teaches that: the discharge from sharp points is to be avoided if the ozone is to be produced efficiently in low current corona discharges.

Although Loeb has shown that sharp points and knife edges as used to generate a corona exhibit high local temperatures, these elements continue to be researched and used despite their low efficiencies. For example, Satoh, et al., U.S. Pat. No. 4,507,266, issued Mar. 26, 1985, discloses an electrode structure having a plurality of edges. Glow discharge is generated between edge portions associated with the cathode and anode surfaces of his device. Such sharp edges result in areas of local high temperature due to glow discharge or arcing. McBlain, U.S. Pat. No. 1,588,976, and Napier, U.S. Pat. No. 2,155,675 teach using corrugated wire mesh electrodes. Mesh electrodes have been frequently corrugated to act as spacers between adjacent dielectric shields to form air gaps where the corona discharge and ozonization takes place. However, such a construction can create hot spots since the electrode is spaced in varying degrees from its complimentary electrode, and the air gap is somewhat encumbered by the presence of the electrode material in the space. Hot spots and sparking sometimes result when the electrode comprises metal projections struck from a sheet metal plate as, for example, disclosed in Leggett, U.S. Pat. No. 1,010,777.

Another cathode/anode geometry, the tube-in-tube (concentric tubular) arrangement avoids using sharp edges to generate a corona and works on the theory that as oxygen passes between the tubular electrodes, it is provided with an extended exposure to an albeit lower energy corona field, thus maximizing the production of ozone. However, this arrangement also permits the reverse reaction of ozone decomposition to establish itself as well. As noted supra, at room temperature, the forward reaction is slightly faster than the reverse reaction resulting in only a 4% concentration of ozone at equilibrium. Thus, the effect of the tubular electrodes is to permit the equilibrium to become established. Beitzel, Canadian patent No. 920,088, issued Jan. 30, 1973, discloses a tubular electrode structure for an ozone generator including a dielectric tube with an electrode on the inner surface of the tube and an electrode on the outer surface of the tube.

Other electrode configurations are also possible. For example, plate type electrodes are disclosed in Schaefer, Canadian patent No. 920,979, issued Feb. 13, 1973, and in Pavel, Canadian Patent No. 1,090,293, issued Nov. 25, 1980.

Size

While ozone generators of the background art seek to maximize the surface area of the electrodes, many of the designs also seek to minimize the increase in size of the ozone generating unit as a consequence of increasing the surface area of the electrodes. Consequently, many ozone generators arrange a number of dielectric shields in cylindrical form in concentric spaced relationship in order to provide maximum electrode surface area while resulting in a minimum increase in size. The spacing between the concentric tubes may be affected by either corrugating the electrode or by striking tongues from the tube walls, as for example, the configuration disclosed by Blackmore et al. in U.S. Pat. No. 743,433. However, such electrode constructions have the aforementioned disadvantages of low ozone concentrations (net 4%) due to establishment of the reverse decomposition reaction, of creating hot spots, and creating interference with the free flow of air to be ozonized through the partially obstructed spaces between the dielectric tubes. A similarly troublesome attempt at efficiently utilizing the space within an ozone generating unit is disclosed in McBlain, U.S. Pat. No. 1,588,976, which teaches forming a spiral roll of successive layers of dielectric and electrode-forming sheets.

Accordingly, there is a need for an ozone generator that is not limited to the net 4% concentration of produced ozone, one that is compact in size and does not create hot spots.

Cooling

Typically, glass or similar material is used as the dielectric shield. However, these materials can be readily cracked or punctured due to moisture or other contaminants in the oxygen or oxygen-containing gas mixtures resulting in an uneven electric field flux onto the dielectric and, in severe cases, arcing. This results in local high temperatures which may thermally crack or puncture the dielectric. Alternately, the high energy corona also creates a substantial amount of stress in the shield material which could also crack the shield. Accordingly, as any heat generated favors the reverse reaction and is potentially destructive to the ozone generator device, it must be dissipated from the corona zone. Such heat dissipation requires an elaborate cooling system.

Typically, a portion of the heat produced by the ozonation process is dissipated by enlarging the electrode surface area with respect to the length of the corona-filled air gap, as exemplified by the tubular electrode arrangement. However, this creates problems of warping with resulting short circuits. Others have sought to cool the electrodes by passing a refrigerant such as water or brine through and/or over them. Aqueous refrigerants cannot be used within the corona area and are, therefore, confined to use within the electrode structure. This calls for enlarging the physical size of the cooled electrode and requires that one side of the electrical circuit be grounded. The serious disadvantage to grounding, however, is that it prevents the use of a center-tapped grounded transformer in the equipment involved to reduce the magnitude of the voltages with respect to ground.

The above mentioned dielectric shield materials can be readily cracked or punctured when excessive stresses are applied to them by hot spots or wide variations in temperature of the air moving over different portions over them. This cracking or puncturing of the dielectric shield will destroy the insulating qualities of these dielectrics and result in arcing and the eventual complete destruction of the dielectric shield. Hot spots can be caused by an unequal distribution of the electric field due to variations in the spacing between the electrodes. Wide extremes of temperature of the air moving over the dielectric shield can be caused by uncontrolled air inlet temperatures during ozonation, and electrodes with large surface areas. While it has been proposed to pre-cool the air to be ozonized in an ozone generating device, as disclosed by Fleck in U.S. Pat. No. 3,024,18, such pre-cooling has not been commercially utilized to any significant extent because it increases the possibility of undesired temperature ranges of the air flowing over the dielectric shields. This temperature gradient may result in sufficient thermal stress so as to crack the dielectric. Thus, most commercial ozone generating units utilize grounded water-cooled jackets surrounding the outermost electrodes resulting in expensive, bulky equipment which in many cases does not adequately cool those portions of the ozone generating unit not immediately positioned near the cooling jackets.

Accordingly, there is a need for an ozone apparatus having integral cooling of the apparatus, cooling of the inlet oxygen without creating wide temperature variations or destruction of dielectric, or smaller electrode surface areas resulting in less thermal stress.

Commercial ozonizers currently used today are typified by the Siemen's Ozonizer, Brodie's Ozonizer and the Siemen's and Halske Ozonizer. All of these ozonizers employ either a concentric tube or parallel plate electrode design having large surface areas, feed the air or oxygen in at atmospheric pressure, and either air cool or water cool the electrodes. For the Siemen's and Halske Ozonizer, the one most frequently used in industry, the supply voltage ranges between 7 KV to 12 KV @500 Hz. Production is at the rate of 50 grams of ozone per kw-hr at a concentration of 2.5 grams of ozone per cubic meter. By comparison, from the heat of reaction (–69 Kcals/mole), the theoretical energy for the production of one gram mole of ozone from oxygen corresponds to a theoretical formation of 1200 grams ozone per kw-hr. Thus, even when operating at low concentrations, the best energy efficiencies exhibited by commercial ozonizers are on the order of 5 to 15%.

Currently available ozone generators and ozone generator technology are thermodynamically inconsistent with the efficient production of ozone. Further, commercial ozonizers exhibit unacceptably low energy efficiencies. Accordingly, there is a long felt need for an ozone generator or ozone generator system whose structure and operating conditions thermodynamically favor the high yield, high volume energy efficient production of ozone.

Water Treatment

On average, an adult should consume approximately two liters of water a day; the equivalent of eight 8-ounce glasses of water. In the process of such consumption, the average person is also consuming those chemical disinfectants used to make the water "safe" to drink. These include the use of chloramines and chlorine disinfectants. Aside from imparting an offensive odor and taste to the water, scientists are now warning that chlorine combines with various dissolved organic compounds to form dangerous chlorohydrocarbons such as thrichloromethane (TCA), thrichloroethane (TCE) and chloroform. These chlorohydrocarbons have been determined to be potential cancer causing agents.

There is a growing recognition that traditional water purification measures—such as ultraviolet irradiation, Chlorine disinfection or halogenated resins—are not adequate to prevent illness caused by some virulent "newcomers." A good example is the Crypto sporidium oocyst (the encysted form of a bi-flagellated protozoan) which is responsible for causing crytosporidiosis in humans. This oocyst can survive for a long time in the environment and cannot be killed by traditional methods. Other microbial or contagious vectors include giardia lamblia (an enteric protozoan which causes a diarrheal illness), hepatitis A, *shigella sonei* and *E. coliform* bacteria. More than 110 types of human viruses—including the entoviruses, hepatitis A virus, Norwalk virus, rotavirus and adenovirus—are major causes of waterborne disease.

In 1985, seventy five thousand pneumonia-like illnesses and 11,250 deaths were attributed to Legionnaires' disease resulting from exposure to legionella. Legionella can infect by inhalation of water vapor from cooling towers, evaporative condensers, hot water tanks, lakes, ponds, streams, puddles, swimming pools, spas or whirlpools and dental units. One study found legionella in 14% of the ground water tested.

Ozone has been extensively investigated as an alternative to chlorination and is now considered the preferred choice for water purification. Ozone disinfects water 5,000 times more rapidly than chlorine, destroying viruses and bacteria in the process. It is also a less expensive process. Over 3,300 European cities treat their drinking water with ozone. Likewise, thirty U.S. cities ozonate their water supply, including Los Angeles which has installed the largest ozone treatment plant in the U.S.

Ozone has been found to be effective against Crypto sporidium, legionella, host protozoa and other biocontaminants. Dosage requirements and contact time will vary depending on the water characteristics, but common ranges are 1 to 10 mg/l of ozone for 15 minutes.

With ozone becoming fast recognized as the disinfectant/bioeradicant of choice in both drinking water and wastewater treatment, there will be a growing demand for ozone production. Applications will range from municipal treatment centers to point-of-use (POU) devices for treating water in the home or office. However, since ozone is an unstable gas and breaks down into molecular oxygen relatively quickly, it must be generated in situ. Accordingly, there is a need for a high yield, high efficiency ozone generator device for the treatment of drinking water and waste water, adaptable for use in from large scale drinking water and waste water in situ ozonation facilities, to small POU in situ applications.

Air Treatment

Sulfur dioxides ($SO_x$) and nitrogen dioxides ($NO_x$) are criteria pollutants under the U.S. Clean Air Act. These compounds are known to contribute to the formation of acid rains which pollute streams and lakes, destroy buildings and kill forests. Consequently, much research has gone into the removal of $SO_x$ and $NO_x$ from flue gas. Methods currently used include:

1) Lime, limestone and dual alkali processes—Form calcium sulfites and sulfates as byproduct. Land fillable disposal.

2) Sodium or ammonia solution—Process uses sodium or ammonia hydroxide or carbonate. Resulting sodium sulfite and nitrites require treatment.

3) Wellman-Lord Process using aqueous sulfite—Liquid $SO_2$, liquid $SO_3$, sulfuric acid or elemental sulfur are byproducts.

4) Citrate—Process using water enhanced by citric acid and sodium hydroxide or carbonate.

5) Magnesium Oxide—Process using magnesium oxide. Liquid $SO_2$, liquid $SO_3$, sulfuric acid or elemental sulfur are byproducts.

6) Dry Sodium Bicarbonate powder injected upstream of a baghouse.

These treatment technologies are either very complicated and capital intensive (Wellman-Lord, titrate and ammonia processes) or create a waste which requires further treatment prior to disposal.

Ideally, a process for removing $SO_x$ and $NO_x$ would be simple and recycle the sulfur and nitrogen as a useable raw material. Accordingly, there is a need for an air treatment process for the removal of $SO_x$ and $NO_x$ from flue gas that will allow reclaiming the sulfur and the nitrogen.

THE INVENTION

OBJECTS

It is an object of this invention to provide an ozone generating device having a small corona discharge space resulting in low oxygen retention time; a high oxygen feed pressure, an internal structure to cool the oxygen gas feed and the resulting ozone product, and a thermally conductive core to provide further cooling capability of the oxygen/ozone product in order to thermodynamically favor the conversion of oxygen to ozone while using up to 50% less energy than currently available ozone generators.

It is another object of this invention to provide a variety of electrodes to eliminate hot-spots, electrical arcing and to maximize homogeneous electric field strength.

It is another object of this invention to provide an ozone generating system using the ozone generating device of this invention connected in parallel to provide a high volumetric flow of ozone.

It is another object of this invention to provide an ozone generating system using the ozone generating device of this invention connected in series to provide high ozone concentration product.

It is another object of this invention to provide a closed loop ozone generating system wherein the ozone is separated from the oxygen to provide a high concentration ozone product and the oxygen is recirculated for further processing in the ozone generator.

It is another object of this invention to use the ozone generator device and systems of this invention for the removal of organic contaminants in drinking water and in waste water.

It is another object of this invention to use the ozone generator device and systems of this invention for the eradication of biological contaminants in drinking water, process water and waste water, including microbial disease vectors.

It is another object of this invention to use the ozone generator device and systems of this invention for the removal of inorganic contaminants, such as chlorine, from drinking water.

It is another object of this invention to use the ozone generator device and systems of this invention for the removal of air pollution contaminants from industrial stack emissions and permit reclaiming of the compound.

Still other objects will be evident from the specification and claims of this application.

SUMMARY

This invention relates to an ozone generating device and system and methods for using the device and system for the treatment of water and flue gases. The ozone generator device of this invention is capable of producing high concentrations of ozone on the order of on the order of from at least 5% to 50%, yet while using up to as much as 50% less energy than currently available ozone generating devices. The device of this invention is designed to be thermodynamically consistent with the maximum, most efficient production of ozone.

Ozone generating units currently known in the art are not designed to thermodynamically favor ozone production. Hardware or device considerations such as electrode geometry, electric field (corona) cavity size and the like will affect ozone production. Process variables such as gas temperature, electric field strength, volumetric flow rates and residence time within the reactor, and the like must also be consistent with the thermodynamics of ozone production.

Accordingly, the structural features of the ozone generator device of this invention and the method of using the ozone generator device of this invention effectively employ the significant variables which affect the production of ozone by providing for a high oxygen or air feed rate and reaction pressure, low oxygen or air temperature, a predetermined and closely regulated residence time in the corona chamber of the ozone generator (as determined by the size of the corona chamber and the volumetric flow rate of the feed oxygen), homogeneous electric field density, and temperature and pressure of the ozone gas generated to produce an unexpectedly high yield of ozone. The structural features of the invention which result in such a high yield of ozone are detailed as follows.

1) Low Residence Time: The ozone generators currently used in the background art seek to maximize the electrode surface area to provide maximum exposure of the oxygen to the electric field and to provide some measure of cooling to the oxygen feed gas. As discussed above, large electrode surfaces may result in their dielectrics being subject to thermal stress. Further, large surface areas teach away from our discovery that there is an optimum size or volume of the ozone generating corona space which critically affects the efficient production of ozone.

The corona cavity must be of a size to ensure adequate flow rate of the feed oxygen, but not be so large as to require too high of an electric potential difference in order to maintain electric field strength sufficient to convert the oxygen to ozone. Further, since the forward reaction of oxygen to ozone is rapid, a large corona cavity is not required. However, a large corona space is typically utilized and taught in the ozone generators of the background art. Oxygen enters one end of concentric, coaxial tubular electrodes and ozonated air exits from the other end. This design arrangement provides a long retention time of the oxygen in the corona zone, thus allowing the forward and reverse reactions (as defined supra) sufficient time to reach equilibrium. Consequently, the forward and reverse reactions compete resulting in a poor net yield of ozone.

In comparison, the device of this invention produces a corona in a very small space, typically 0.25–2 $cm^3$, resulting in an extremely short retention time for oxygen in the corona zone. The retention time is calculated to minimize the decomposition of ozone to oxygen. In the corona zone, oxygen converts to ozone and, due to the short retention time, the reverse reaction has not had a chance to establish itself. This results in a concentration of ozone much higher than is achievable with the tubular ozone generators.

2) High Oxygen Pressure: The ozone generators of the background art provide no teaching as to the optimum pressure of the oxygen or air with respect to the effect of such pressure on ozone yields. The background ozone generators operate at a very low pressure, typically at atmospheric pressure. However, this invention goes contrary to the teachings of the prior art to take advantage of a decrease in volume, i.e., 3 volumes of oxygen giving 2 volumes of ozone during ozone production and the recognition by us that higher oxygen pressure thermodynamically favors high conversion of oxygen to ozone. In the device of this invention the corona zone is designed to operate in a range from 1 to several thousand psi. This high pressure condition physically brings oxygen molecules very close and, in the presence of a high energy corona zone, very efficiently converts the oxygen to ozone.

Additionally, the use of high pressure oxygen in this invention permits the use of higher voltages in the corona chamber. High pressure gases will not ionize to form a glow discharge or an arc as readily as gases at low pressure. This permits the buildup of an electric field in the corona chamber that might otherwise are at lower (e.g., atmospheric) pressures, thus reducing arcing.

3) Cooling: The formation of ozone is an endothermic reaction requiring approximately 69 kilocalories per mole. To minimize the decomposition of ozone, it is important to cool ozone to a low temperature as soon as it is formed. The ozone generators in the background art typically use electrodes with large surface area and lower energy corona fields to keep the oxygen/ozone temperatures low. These large surface electrodes are generally either air cooled or water cooled. However, these large electrode surfaces limit the working pressure of the oxygen, as well as result in an increase in residence time of the oxygen within the corona field allowing the reverse reaction of ozone decomposition to become established. Further, air or liquid cooling of the electrodes may not sufficiently cool the oxygen/ozone gas to significantly improve the concentration of produced ozone, particularly, if the gas flow rates are large enough that insufficient heat transfer takes place.

The core structure of the device of this invention is constructed from a thermally conductive material and is designed to quickly remove any heat generated in the corona chamber. In addition, the core structure is ducted to efficiently circulate very low temperature coolant throughout the ozone generator. Ducts surrounding the inlet port, corona chamber and outlet port permit circulating a low temperature coolant, resulting in a significant reduction of temperature of the feed oxygen an the resulting ozone product, thus substantially reducing the reverse, $O_3 \rightarrow O_2$, reaction rate the background art teaches away from the cooling mechanism of the ozone generator of this invention in that the surface area of the electrodes need not be large, as taught in the background art, since the electrodes of the device of this invention are not now used principally as a heat transfer surface. As a result, there are no large temperature gradients across the dielectric in the device of this invention and, consequently, there is no danger of thermal stress cracking of the dielectric.

Further, by making the electrode surface area independent of the cooling of the feed and product gases, the corona chamber volume may now be optimized for the appropriate residence time. As explained above, the residence time is critical in that the forward reaction is faster and is favored by calculating a residence time that is long enough to permit maximum conversion of oxygen to ozone, yet short enough to not allow the reverse decomposition reaction to become established.

Suitable coolants include liquids, gases, liquefied gases and multi-phase mixtures (including evanescent solids, liquids and gases such as air, oxygen, nitrogen, pressurized liquid carbon dioxide), dry ice/liquid hydrocarbon mixtures, chilled water, and the like. Using liquid oxygen, liquid ozone or liquid air to cool the corona zone thereby has the potential to halt the reverse reaction completely. In such conditions almost 100% conversion to ozone is anticipated. Further, the liquefied oxygen or air coolant, once used, may be used as feed stock to the ozone generator.

Additional cooling is achieved by using a venturi or a porous plug at either or both the inlet and outlet pore of the ozone generator through which the oxygen or ozone is throttled. Both the venturi and the porous plug allow the oxygen or ozone passing through it to further cool as a result of adiabatic cooling (as is the case for a venturi) or the Joule-Thompson effect. The Joule-Thompson effect occurs when a gas under high pressure is allowed to freely expand against a smaller external pressure. The effect is a decrease in the temperature of the gas. In the device of this invention, the porous plug represents a significant pressure drop, allowing the free expansion of the gas.

4) Energy: All existing ozone generators use high electrical energy to produce a corona. In the ozone generator device of this invention the same amount of electrical energy is used to produce at least twice the quantity of ozone typically produced in an ozone generator of the prior art. This is due in part by controlling the extent of the reverse reaction (by cooling and control of short retention times), and by design and selection of the electrode to create an intense homogeneous, non-arcing corona. The reverse reaction is minimized by reducing the retention time within the corona chamber, and by the combination of the various cooling mechanisms to reduce the reverse; reaction rate. Further the combination of lower temperature, high pressure and electrode design work together in further improving the energy efficiency of the device of this invention. Unexpectedly, the ozone generator of this invention uses up to 50% less energy per unit of ozone produced than the background technologies.

In a further refinement of this invention, either or both the corona chamber walls or the electrode may be coated with catalyst to promote the conversion of oxygen to ozone. Barium oxide and other catalysts may be used to enhance the yield of ozone.

5) Electrodes: The electrode is centrally spaced within the spherical corona chamber to ensure that the air gap between the electrode and the walls of the corona chamber is evenly spaced. This helps ensure that the electric field density is homogeneous throughout the corona chamber. Further, as there are no stationary sharp edges, burrs, spurs or points on the electrode or the walls of the corona chamber, intense electric fields can be formed without arcing.

The electrodes used in the ozone generator device of this invention may include metal electrodes, rotating electrodes, and liquid electrodes. As it is critical to maintain a homogeneous electric field density in order to produce high electrical potentials in the corona chamber without arcing, the selection of electrode is important as different materials may corrode in the extremely oxidizing environment of the corona chamber, thus adversely affecting the homogeneity of the electric field. Accordingly, the walls of the corona chamber and the electrodes used must not deteriorate (e.g., corrode) so as to create areas of non-uniform conductance resulting in uneven electrical flux on its surface, which in turn will result in arcing.

The metal electrodes may be either a hollow or solid gold or platinum, or some other material plated with either gold or platinum, both metals being inert in the extremely oxidizing environment of the corona chamber. Alternately, the metal electrode may be any metal having an impermeable dielectric coating applied thereon. So long as the dielectric is impermeable to the pressurized ozone/oxygen environment, nearly any electrical conductive metal may be used as the electrode. The walls of the corona chamber must be constructed of a material that remains inert to the oxidizing effects of the ozone. Accordingly, the walls of the chamber must be constructed from or coated with an oxygen/ozone-impermeable dielectric or other inert material such as a noble metal, e.g. gold, platinum, nitrided titanium or the like.

An alternate embodiment of the electrode is a rotating or "dynamic" electrode. Instead of a spherical solid metal or coated metal terminal end, it employs an electrically charged conductive "bristle" brush, centrally located within the corona chamber, spinning at high speed. Whereas the ends of each bristle of the brush would ordinarily ionize the air in its vicinity creating a conductive "ion path" resulting in either a glow discharge or arcing, rotating the brush electrode prevents the formation of the ion path and permits the use of higher electric field strengths without arcing. The brush may be made of any electrically conductive material including all metals and conductive plastics. Since the rotation of the electrode precludes the buildup of any stationary area of diminished conductance, the choice of metal is not as critical as it is for a stationary (i.e., non-rotating electrode). Indeed, were the solid, stationary electrode described above to be rotated, the choice of conductive material would also be less critical in that any inhomogeneity in the electric field due to stationary areas of diminished conductance would be mitigated by the spinning electrode.

A third electrode alternative is a liquid-filled electrode. This electrode is similar in shape to the solid stationary electrode in that is spherically shaped to maintain a constant spatial distance between the surface of the electrode and the walls of the corona chamber. However, the liquid electrode is constructed of a hollow dielectric having a conductive electrolyte solution contained therein. The advantage of the liquid electrode is that very even, homogeneous electric fields may be established and maintained. Since the dielectric (typically glass, quartz, sapphire, or ceramic) is selected so as to be inert in the oxidizing environment of the corona chamber, no variations in conductance of the electrode surface will form. An electron-permeable dielectric and a uniform electrolyte solution that distributes the charge evenly ensure that the corona field is homogeneous, thus permitting the use of comparatively more intense fields.

Systems

The ozone generators of this invention may be operated in parallel to produce high volumes of ozone, in series to produce high concentrations of ozone, or in a parallel-series combination where intermediate volumes and concentrations of ozone are desired.

Where the single ozone generators of this invention are connected in parallel and/or series, the product gas between stages may be cooled prior to entering the next stage. This arrangement will significantly reduce the decomposition of the ozone created in the prior stage and result in very high ozone concentrations. As the oxygen/ozone mixture approaches its dew point (−111.9° C. for ozone and −183° C. for oxygen), ozone conversion approaches 100%.

In a further embodiment, the ozone generator of this invention may be incorporated into a closed loop system. In this system, the ozone produced from the ozone generator device of this invention is separated from any residual oxygen by using any separation means. Since ozone has physical characteristics distinct from oxygen (higher freezing temperature, higher molecular weight, and larger molecular size) various techniques may be employed including:

a cold trap whereby the ozone is condensed out;

a molecular membrane filter of a pore size to permit the oxygen to pass through but retain the ozone;

a vortex cooler (Maxwell demon) wherein the heavier ozone molecules are tapped off from the center of the cooler, and chemical separation, such as immediate consumption of the ozone, or reversible sequestration of the oxygen, e.g. by a barium-barium oxide pellet system. The oxygen is collected, cleaned and dried if needed, repressurized and recirculated to be used as feed gas.

Treatment of Water and Air

A use of the ozone generator and systems of this invention is to facilitate the removal of sulfur dioxides and nitrogen dioxides from flue gas. Ozone is a very powerful oxidizing agent, second only to fluorine. Injecting ozone in the presence of steam into the flue gases will result in the immediate oxidation of sulfur, phosphorus, arsenic and iodine into sulfuric, phosphoric, arsenic, and iodic acids. Sulfur dioxides and nitrogen dioxides are oxidized into sulfuric acid and nitric acid respectively. All of these acids may then be removed from the flue gas by wet or dry scrubbing (wet-scrubbing involves dissolving the acidic gases in water; dry-scrubbing is by absorption of the acidic gases into a dry absorbent such as limestone, soda ash or a sodium bicarbonate source) for nearly 100% removal of the acids. The scrubbing waste may be reclaimed for the acid, or neutralized and disposed of as a non-hazardous waste pursuant to local waste water discharge ordinances.

The ozone generator and systems of this invention are particularly suited for the treatment of water. In particular, the high concentrations of ozone produced by the device and systems of this invention will eradicate microbial biocontaminants such as bacteria, viruses and protozoa in less time as compared to devices producing lower concentrations of ozone or as compared to other disinfectants such as chlorine. Also, the higher concentrations of ozone produced from the device and systems of this invention will oxidize undesirable chemical contaminants such as chlorine, as well as all organic contaminants such as chloramines, haloalkyls, aromatics and the like to as-treated, very low concentration levels unattainable by use of ozone in lower concentrations, in a short a period of time.

Point-of-use treatment of drinking water for dechlorination and removal of organics has been a long-felt need. Traditional ozonizers are bulky and expensive to install and maintain. Fragile glass tubes or plates break readily and require frequent maintenance. By comparison, the ozone generator of this invention is very compact, easily installed and requires almost no maintenance. Further, the device of this invention can operate over a broad range of process conditions while still producing relatively high concentrations of ozone. For example, in a domestic environment, atmospheric pressure, or low pressure oxygen or air may be used. Further, chilled water may be used to cool the device rather than liquid air or nitrogen. The flexibility of the device permits it to be adapted to a wide range of process environments, an advantage not found in the presently available ozonators.

BRIEF DESCRIPTION OF THE DRAWINGS

The invention is illustrated by reference to the drawings in which:

FIG. 1 shows a cross-section view of an embodiment of an ozone generator device in accord with this invention wherein the electrode is a single electrically-conductive electrode and the internal structure employs a venturi for cooling of the ozone/oxygen;

FIG. 2 shows a top plan view of the ozone generator device embodiment of FIG. 1;

FIG. 3a and 3b shows a cross-section view of another embodiment of an ozone generator device of this invention wherein the electrode is a rotating electrically conductive brush electrode with a sintered plug at the inlet and a venturi at the outlet port;

FIG. 4 shows a cross-section view of still another embodiment of an ozone generator device of this invention wherein the electrode is a hollow dielectric bulb containing an electrolyte therein, and employs an inlet and outlet venturi for cooling the feed and product gases;

FIG. 5 is an isometric view of an ozone generating system of this invention wherein a plurality of ozone generator units of this invention are combined in parallel in a single structure;

FIG. 6 is a schematic of an ozone generating system embodiment of this invention wherein ozone generating units are connected in series with a cooling means disposed between each ozone generating unit; and FIG. 7 is a schematic of an embodiment of a close-loop ozone generating system of this invention.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows a cross-sectional view of a first embodiment of an ozone generator device 1 of this invention. The body of the device is a thermally and electrically conductive core 2 into which an electrode assembly 3 is introduced though an electrode port 4 passing through one side of the core 2 and terminating into a corona cavity 5. The core is preferably made from a highly electrically and thermally conductive material such as aluminum, copper, silver, titanium or the like.

The corona cavity 5 is a chamber within the core 2, the volume of which is calculated, in consideration of the feed oxygen volumetric flow rate, to provide an oxygen retention time within the cavity that maximizes ozone production, but minimizes the opportunity for the reverse reaction from ozone to oxygen. This retention time is determined from the volume of the chamber and the volumetric flow rate of the feed oxygen 11. The appropriate retention time required is a function (dependent upon) several factors including temperature and pressure of the oxygen, and the electric field strength, but may be approximated, at room temperature, by the expression:

Retention Time=V/q where:

V=the net volume of the corona cavity (i.e., the volume of the corona chamber minus the volume of the electrode extending into the corona chamber); and q=the volumetric flow rate of the oxygen-containing feed gas.

At room temperature and atmospheric pressure, the retention time is in the range of about 0.1–100 milliseconds, while at lower temperatures the retention time may be increased since the reverse reaction rate of conversion from ozone to oxygen is reduced.

A high-voltage source 12 is connected to the electrode assembly 3 by contact with a metal rod 6, and to the core 2. The high voltage source charges the electrode 8 and provides an opposite charge to the core 2. The voltage is just high enough to create an intense electric field in the corona chamber 5 between the electrode 8 and the wall 10 of the corona chamber without an electrical arc. The frequency of the high voltage source 12 may range from direct current (DC) to several thousand Hertz, and preferably about 500 Hertz. While an electric field of higher frequency has a higher energy density, insulation becomes problematic since surface currents may form.

The conducting stem, typically a metal rod, 6 is centrally located in an insulating pass-through plug 7 and runs longitudinally through the plug, exiting at the opposite end of the plug inside the corona chamber 5 in an electrode end 8. The electrode end 8 is preferably shaped so as to have no sharp edges that might provide an opportunity for an electrical arc to discharge between the electrode end and the walls of the cavity. Electrical arcing is to be avoided as this heats the oxygen resulting in an increased reverse reaction rate. Preferably, the inner wall of the cavity 9 is coated with a dielectric 10 to further ensure a uniform electric field flux between the electrode end 8 and the walls 9 of the corona chamber 5. The dielectric 10 may be a plastic, glass, ceramic or any other dielectric material able to withstand the intense electric field and high ozone concentrations without breakdown. The electrode assembly includes an electrical conducting means, as exemplified by the rod 6, and an insulating or dielectric element 7 to spatially maintain a fixed separation of the conduction means 6 from the electrically and thermally conductive core 2 so as to prevent electrical contact, such as an electrical arc.

The oxygen 11 entering the oxygen inlet port 13 must be dean, i.e. filtered, and dry. Any contaminants in the feed oxygen 11 would promote electrical arcing or would accumulate on the electrode 8 or the dielectric 9 thus either reducing the electric field strength, provide points from which arcing may occur, or reduce, overtime, the spacing 5 between the electrode end 8 and wall 9 and 10, thus inducing arcing. In any event, the efficiency of the ozone generator is reduced. In passing through the corona chamber 5, the oxygen is converted to ozone. The volume of the corona chamber is calculated to provide a retention time such that the converted ozone passes through the corona chamber before the reverse reaction can take place. A shaped outlet passage 14 leads to a venturi chamber 24 at the entrance of the outlet bore hole 15 which permits adiabatic cooling of the product gas 16 to take place as it exits the ozone generator through the exit port 90, thus further cooling the product gas to reduce the rate of the reverse reaction.

Preferably, the oxygen-containing feed gas 11 is cooled to as low a temperature as possible prior to entering the corona chamber 5, thus thermodynamically favoring as complete a conversion to ozone as possible. Cooling ducts 17 and 18 may be positioned throughout the core. 2 allowing a coolant to circulate through the core, particularly around the inlet bore hole 20 and the outlet bore bole 15, thus cooling the feed air or oxygen 11 and the product gas 16. Coolants may include liquid nitrogen, pressurized liquid carbon dioxide, alcohol and the like. Cooling ducts 18 surrounding an elongated oxygen inlet bore hole 20 permit maximum cooling of the air or oxygen feed 11 prior to entering the corona chamber 5. In the preferred embodiment, baffles 19 may be placed in the inlet port thus promoting turbulent flow of the oxygen through the cooling port, resulting in increased contact of the oxygen 11 with the cold surfaces of the core 2 and baffles 19. Alternately, the baffles 19 may be configured as a series of concentric tubes or any other arrangement that maximizes contact of the feed oxygen 11 with the cold core material.

FIG. 2 is atop plan view of the ozone generator of this invention. Cooling ducts 17 and 18 are shown running transversely through the core. In an alternate preferred embodiment (not shown), the cooling ducts may run longitudinally through the core with the coolant traveling counter-current to the flow of the oxygen resulting in more efficient cooling of the oxygen 11 and product gas 16. In FIG. 2 the baffles 19 are shown running from the side walls of inlet 20 rather than the top and bottom as in FIG. 1.

FIG. 3 shows a cross-section view of an alternate preferred ozone generator of this invention wherein the electrode rotates. A electrically-conductive rotating shaft 21 is centrally mounted along the longitudinal axis of the insulating element 7. A spherically shaped conductive brush 22 is in electrical contact with and mounted on the terminal end of the rotating shaft 21 such that the brush 22 is spatially centered within the corona chamber 5. The rotating brush 22 is electrically charged, as it is in electrical contact with the rotating shalt 21, which in turn is connected to high voltage source 12. The rotating electrode 22 is an improvement over the solid electrode of FIG. 1 since the rapid movement of the many conductive wires of the brush prevent the buildup of uneven electric field densities. By "homogenizing" the electric field, the possibility of an electrical arc within the corona chamber 5 is minimized and higher electric field densities may be utilized.

FIGS. 3a and 3b also shows the use of a sintered or porous plug 23 adjacent the corona chamber end of the oxygen inlet bore hole 20. The porosity of the plug is such that there is a predetermined pressure drop of the feed air or oxygen 11 as it passes through plug. This results in Joule-Thompson free expansion cooling of the feed gas, thus favoring the thermodynamics of ozone production and disfavoring the thermodynamics of the reverse reaction. Although FIG. 3a and 3b show venturi 24 in the outlet bore hole 15 to permit adiabatic and free-expansion cooling, an alternate preferred embodiment is shown in FIG. 3b which includes a sintered plug 92 at the entrance of the outlet bore hole 90 (adjacent the chamber 5) instead of or in addition to the venturi 24. The use of sintered plugs in both the inlet and outlet bore holes facilitate construction of the ozone generator with a consequent reduction in manufacturing cost. Further, sintered plugs having different pressure drops may be used to effect maximum cooling, considering the differences in volumetric flow of the oxygen and ozone-containing product gas through the ozone generator. Note in FIG. 3b the outlet bore 15 is smaller than the inlet bore as the molal volume of ozone ($O_3$) is less than the molal volume of oxygen ($O_2$). Note also in FIG. 3b that the label "I.D." associated with ozone output 16 indicates the product gas can be withdrawn by induced draft from a fan or pump (not shown).

FIG. 4 is a cross-section view of another embodiment of the ozone generator device of this invention wherein the preferred electrode 30 is a liquid electrolyte electrode. A hollow dielectric bulb 31 is centrally disposed within the corona chamber 5. A hollow dielectric stem 32 extends from the bulb 31 centrally up the longitudinal axis of the dielectric or insulating element 7. The bulb may be made of any dielectric material including glass, quartz, vitreous ceramic and the like. The use of a dielectric encased liquid electrode makes lining the corona chamber 5 with a dielectric material of lesser importance.

The dielectric bulb 31 is filled with an electrolyte 33 that will withstand high voltages without breakdown, such an electrolyte being sulfuric acid. The electrolyte is electrically connected to the high voltage source 12 by means of a conducting wire 34 placed in the electrolyte 33. Note also the alternative venturi port inlet configuration 14a.

Note that while FIG. 4 shows venturis at both the inlet and outlet ports for the free-expansion cooling of the feed oxygen and the product gases respectively, sintered plugs may be used at either or both ports.

FIG. 5 shows a plurality of ozone generator units of this invention connected in parallel for high volumetric flow rate requirements. The parallel assembly 40 may be assembled in an array from individual units with the cooling ducts 17 and 18 of each unit interconnected to provide an integrated cooling system for the array.

FIG. 6 diagrammatically shows ozone generators 1a–1c connected in series. Intercoolers 50 may be added between each stage, and before the first stage, to progressively cool the oxygen/ozone gas mixture to significantly increase the ozone concentration in the ozone/oxygen product exiting the final stage. These intercoolers may be any type of liquid-gas heat exchanger. Coolant 51 is preferably run countercurrent through the intercoolers to ensure maximum cooling of the gas in the later stages, as the increasing ozone concentration in the later stages would ordinarily thermodynamically begin favoring the reverse reaction. The ozone generator at each stage may be individual units or multiple parallel units (as in FIG. 5) at each stage to produce high volume and high concentrations of ozone.

The ozone generator device of this invention is particularly well suited for use in a multistage, closed-loop ozone generating system as shown diagrammatically in FIG. 7. Oxygen gas or air (oxygen mixture) is stored under pressure in compression and storage units 60. Compression and storage unit 60 includes pumps, compressed gas tanks and cylinders, and chemical storage means whereby the supply oxygen mixture may be generated by chemical reaction. In operation, the oxygen mixture is piped through line 71 to a filter means 61 where particulate contamination and moisture that may be in the gas is removed. The filtering and moisture removal means includes: passing the oxygen mixture through a desiccating liquid, a particulate filter and desiccant combination, or by a particulate filter and refrigeration dehumidifier. The oxygen mixture is piped through line 72 and into the first cooling means 62 whereafter, the cooled oxygen mixture enters the first stage ozone generator 63 via line 73. The product gas (oxygen/ozone mixture) is directed through pipe 74 and through the second cooling means 64. The still cooler oxygen/ozone mixture is transferred through pipe 75, through the second stage ozone generator 84, followed by transfer through pipe 76, additional cooling through cooling means 65, transfer through pipe 77, through the third stage ozone generator 66, and further transfer through pipe 78.

It is evident that the ozone generating system may contain as few as one stage, or as many stages as desired. Each ozone generator stage may be comprised of an individual ozone generator unit, or an ozone generator assembly where multiple ozone generator units may be interconnected in series, parallel, or series-parallel. The inter-coolers 62, 64, and 65 may be any cooling means including refrigeration units, gas-gas heat exchangers, or preferably, liquid-gas heat exchangers. Preferably, the coolant for the inter-coolers 67 may be run counter-current as shown in FIG. 7 from coolant inlet 67 to outlet at 69 and through the staged inter-coolers (i.e., in series) such that the last stage 65 is exposed to the coolant at its coldest. This is thermodynamically consistent with retarding the decomposition of ozone to oxygen, since the ozone concentration in the last stage is higher than in the prior stages. Alternately, each inter-cooler may have its own coolant supply (i.e., the inter-coolers are individual or connected in parallel).

Similarly, the coolant flowing through the cooling ducts of each ozone generator stage may be connected such that the ozone generators are connected in series (as shown in dashed lines) or in parallel (as Shown in solid lines). In an alternate embodiment the coolant for the inter-coolers may be shared and used for the ozone generators as well. Suitable coolants include liquefied gases, chilled water, chilled halogenated solvents, and the like. If liquid oxygen is used as the coolant, any refugee gas escaping from the cooling means may be recovered for use as feed oxygen. All piping is preferably insulated and kept as short as possible.

The ozone/oxygen product exiting the last stage is transferred via pipe 78 to separator means 68. Separation of the ozone 79 as a separate stream from the feed oxygen 80 may be accomplished by condensation of the ozone from the gas mixture via a cold finger or the like, by molecular filtration through a membrane, by centrifugal separation through a vortex cooler, or merely by consuming the ozone as its produced (for example, where the product ozone/oxygen gas is bubbled through water to be treated, the ozone is consumed and the head space above the water will contain the unconverted oxygen). The separated oxygen 80 is transferred from the separator means 68 through line 80 and into the compression/storage means 60, thus completing the closed loop.

The quality of the ozone produced by the device and systems of this invention is such that uses, such as eradication and sterilization of biocontaminants from drinking water, or the oxidation of organics and chlorine from drinking water or waste water, may be accomplished in a much shorter time than would otherwise be possible with ozone of lower concentration as produced from ozone generators currently available.

Although the present invention described herein and above are preferred embodiments, it is understood that after having read the above description, various alternatives will become apparent to those persons skilled in the art. We therefore wish our invention to be defined by the scope of the appended claims as broadly as the prior art will permit, and in view of the specification.

We claim:

1. An ozone generator apparatus for conversion of an oxygen-containing feed gas to an ozone-containing product gas, comprising:
   a) a generally spherical corona chamber having:
      i) at least one interior wall surface,
      ii) a feed gas inlet and a product gas outlet port in said interior wall surface, and
      iii) an electrode port in said interior wall surface;
   b) an electrode assembly comprising:
      i) an electrode member disposed in said corona chamber, and
      ii) an electrically conductive stem member disposed to pass through said electrode port while insulated from said corona chamber and terminating in said chamber and connected to said electrode member;
   c) said electrode member is shaped to be spatially concentric with and spaced inwardly of said interior wall surface of said corona chamber to provide an annular space therebetween configured to provide a substantially uniform electric field upon application of an electric potential between said electrode member and said corona chamber wall;
   d) means for cooling at least one of:
      i) oxygen-containing feed gas entering said corona chamber via said inlet port,
      ii) said corona chamber, and
      iii) ozone-containing product gas withdrawn from said corona chamber via said outlet port;
   e) said cooling is of a capacity sufficient to suppress ozone to oxygen reverse reaction; and
   f) said corona chamber has a volume selected to provide feed gas retention time sufficient to thermodynamically maximize the production of ozone.

2. An ozone generator apparatus as in claim 1, including:
   a) a gas throttling means disposed in association with at least one of said feed gas inlet port and said product gas outlet port for cooling the gas passing therethrough.

3. An ozone generator apparatus as in claim 2 wherein:
   a) said gas throttling means is a venturi.

4. An ozone generator apparatus as in claim 2 wherein:
   a) said gas throttling means is a porous plug.

5. An ozone generator apparatus as in claim 1, including:
   a) baffles associated with said feed gas inlet port to provide cooling of said feed gas by turbulent flow contact with said cooling means.

6. An ozone generator apparatus as in claim 1 wherein:
   a) said electrically conductive stem is constructed from metal at least the surface of which is corrosion resistant.

7. An ozone generator apparatus as in claim 1, including:
   a) means for rotating said electrode member around an axis of said conducting stem to improve the maintenance of a uniform electric field density.

8. An ozone generator apparatus as in claim 7 wherein:
   a) said electrode member comprises a generally spherical electrically conductive brush.

9. An ozone generator apparatus as in claim 1 wherein:
   a) said electrically conductive stem comprises a hollow dielectric containing an electrolyte, and
   b) said electrode of said conducting stem is a generally spherical hollow dielectric containing an electrolyte.

10. An ozone generator apparatus as in claim 9 wherein:
    a) said dielectric is selected from the group of materials consisting essentially of glass, quartz, sapphire, ceramic, and plastic.

11. An ozone generator apparatus as in claim 1 wherein:
    a) said corona chamber walls have a dielectric layer deposited thereon.

12. An ozone generator apparatus as in claim 11 wherein:
    a) said dielectric is selected from the group of materials consisting essentially of glass, quartz, sapphire, ceramic, and plastic.

\* \* \* \* \*